(12) United States Patent
Phadke et al.

(10) Patent No.: US 12,438,437 B2
(45) Date of Patent: Oct. 7, 2025

(54) DYNAMIC CONTROL OF AC-DC POWER CONVERTER PFC FRONT END DURING LOAD TRANSIENTS

(71) Applicant: Apple Inc., Cupertino, CA (US)

(72) Inventors: Vijay G Phadke, San Jose, CA (US); Liang Zhou, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 324 days.

(21) Appl. No.: 18/321,287

(22) Filed: May 22, 2023

(65) Prior Publication Data

US 2024/0396473 A1 Nov. 28, 2024

(51) Int. Cl.
*H02M 1/42* (2007.01)
*H02M 1/00* (2006.01)
*H02M 1/44* (2007.01)
*H02M 1/14* (2006.01)
*H02M 7/5387* (2007.01)

(52) U.S. Cl.
CPC ......... *H02M 1/007* (2021.05); *H02M 1/0025* (2021.05); *H02M 1/4225* (2013.01); *H02M 1/44* (2013.01); *H02M 1/0009* (2021.05); *H02M 1/143* (2013.01); *H02M 7/53873* (2013.01)

(58) Field of Classification Search
CPC ...... H02M 1/143; H02M 1/42; H02M 1/4208; H02M 1/4225; H02M 1/4241; H02M 1/4258; H02M 7/02; H02M 7/04; H02M 1/44
See application file for complete search history.

(56) References Cited

U.S. PATENT DOCUMENTS

| | | | |
|---|---|---|---|
| 8,232,786 B2 | 7/2012 | Phadke et al. | |
| 2006/0175313 A1* | 8/2006 | Kooken | B23K 9/1075 219/130.1 |
| 2009/0091957 A1* | 4/2009 | Orr | H02M 3/3376 363/79 |
| 2010/0226149 A1* | 9/2010 | Masumoto | H02M 3/1584 363/20 |
| 2010/0302808 A1* | 12/2010 | Uemura | H02M 3/33571 363/15 |
| 2013/0194698 A1* | 8/2013 | Sase | H02M 1/4258 363/21.02 |
| 2015/0229204 A1* | 8/2015 | Mao | H02M 7/217 327/109 |

* cited by examiner

*Primary Examiner* — Gary L Laxton
(74) *Attorney, Agent, or Firm* — FLETCHER YODER PC

(57) ABSTRACT

An AC-DC power supply can include a PFC stage that receives a rectified AC input voltage and produces an intermediate DC bus voltage; a DC-DC stage that receives the intermediate DC bus voltage and produces a regulated DC output voltage; and a digital controller. The digital controller can include a relatively faster DC-DC stage controller that receives DC-DC stage feedback signal(s) and produces DC-DC drive signal(s) for switching device(s) of the DC-DC stage; a relatively slower PFC stage controller that receives PFC feedback signal(s) and produces PFC drive signal(s) for switching device(s) of the PFC stage; and control logic that receives periodic output power indications of the AC-DC power supply and uses them to cause the PFC drive signal(s) to respond to a change in output power of the AC-DC power supply more quickly than would be achieved by the relatively slower PFC stage controller.

19 Claims, 12 Drawing Sheets

DYNAMIC CONTROL OF AC-DC POWER CONVERTER PFC FRONT END DURING LOAD TRANSIENTS

BACKGROUND

AC-DC power converters used in computer applications may include input harmonic current corrections above a certain power rating (e.g., 75 W). Modern AC-DC power converters may employ active power factor correction (PFC) circuits as a preferred harmonics correction approach. Some designs may use a two-stage power converter that includes a front-end power factor correction (PFC stage) in form of a boost converter followed by a DC-DC converter stage. In some architectures, the DC-DC converter stage can include multiple stages.

In at least some implementations, the DC-DC stage controller may have a relatively high bandwidth (e.g., on the order of 100 kHz), while the PFC stage may have a relatively low bandwidth (e.g., on the order of 10 Hz). Thus, an output load transient can cause the DC-DC stage to respond very quickly, while the PFC stage may take longer to respond. As a result, energy stored in a bulk capacitor supporting an intermediate DC bus connecting the stages can make up the difference in power between the stages while the slower PFC stage responds. Depending on the particulars of a given system, this can result in a bulk capacitor with a larger capacitance and/or voltage rating than would otherwise be required. Both capacitance and voltage rating directly correlate with both physical size and cost of the bulk capacitor, meaning that the bulk capacitor may also be physically larger and more expensive than would otherwise be the case.

SUMMARY

Thus, it may be desirable to provide systems that allow for reduction in the capacitance, voltage rating, physical size, and/or cost of the bulk capacitance. One approach to realizing such systems is to improve the responsiveness of the PFC stage to load transients through the use of improved control techniques as described in further detail below.

An AC-DC power supply can include a power factor correction (PFC) stage that receives a rectified AC input voltage and produces an intermediate DC bus voltage; a DC-DC stage that receives the intermediate DC bus voltage and produces a regulated DC output voltage; and a digital controller. The digital controller can include a relatively faster DC-DC stage controller that receives one or more DC-DC stage feedback signals and produces in response thereto one or more DC-DC drive signals for one or more switching devices of the DC-DC stage; a relatively slower PFC stage controller that receives one or more PFC feedback signals and produces in response thereto one or more PFC drive signals for one or more switching devices of the PFC stage; and control logic that receives periodic output power indications of the AC-DC power supply and uses them to cause the one or more PFC drive signals to respond to a change in output power of the AC-DC power supply more quickly than would be achieved by the relatively slower PFC stage controller.

The PFC stage can be a critical conduction mode (CrCM) boost converter. A significant control signal of the CrCM boost converter can be an on time of a boost switch of the CrCM boost converter; and the control logic can multiply the significant control signal by a ratio between subsequent output power indications of the AC-DC power supply. The control logic can multiply the significant control signal by a ratio between subsequent output power indications of the AC-DC power supply only if the ratio exceeds a threshold. The PFC stage can be a continuous conduction mode (CCM) boost converter. A significant control signal of the CCM boost converter can be a multiplier of the CCM boost converter; and the control logic can multiply the significant control signal by a ratio between subsequent output power indications of the AC-DC power supply. The control logic can multiply the significant control signal by a ratio between subsequent indications of output power of the AC-DC power supply only if the ratio exceeds a threshold.

Periodic output power indications of the AC-DC power supply can be derived at least in part from output current measurements of the DC-DC stage. The periodic output power indications of the AC-DC power supply can be derived from output current and output voltage measurements of the DC-DC stage. The periodic output power indications of the AC-DC power supply can be derived from input current and input voltage measurements of the DC-DC stage. The periodic output power indications of the AC-DC power supply can be derived from a control parameter of the DC-DC stage.

A method of controlling an AC-DC power supply having a power factor correction (PFC) stage that receives a rectified AC input voltage and produces an intermediate DC bus voltage and a DC-DC stage that receives the intermediate DC bus voltage and produces a regulated DC output voltage can include: receiving one or more DC-DC stage feedback signals and operating one or more DC-DC stage switching devices in response thereto to produce the regulated DC output voltage; receiving one or more PFC feedback signals and operating one or more PFC stage switching devices in response thereto to produce the intermediate DC bus voltage; and receiving periodic output power indications of the AC-DC power supply and using them to cause one or more PFC drive signals to respond to a change in AC-DC power supply output power more quickly than would be achieved in response to the one or more PFC feedback signals.

Using the periodic output power indications of the AC-DC power supply to cause the one or more PFC drive signals to respond to a change in AC-DC power supply output power more quickly than would be achieved in response to the one or more PFC feedback signals can include multiplying a significant control signal of the PFC stage by a ratio between subsequent output power indications of the AC-DC power supply. Multiplying the significant control signal by a ratio between subsequent output power indications of the AC-DC power supply can occur only if the ratio exceeds a threshold. Using the periodic output power indications of the AC-DC power supply to cause the one or more PFC drive signals to respond to a change in AC-DC power supply output power more quickly than would be achieved in response to the one or more PFC feedback signals can include multiplying a significant control signal of the PFC stage by a factor derived from a difference between subsequent output power indications of the AC-DC power supply. Multiplying the significant control signal by a factor derived from a difference between subsequent output indications of the AC-DC power supply can occur only if the difference exceeds a threshold.

A digital controller for an AC-DC power supply having an input power factor correction (PFC) stage that powers an output DC-DC stage can include: first control logic that receives one or more DC-DC stage feedback signals and operates one or more switching devices of the DC-DC stage in response thereto to produce a regulated DC output voltage; second control logic that receives one or more PFC feedback signals and operates one or more switching devices of the PFC stage in response thereto to produce a regulated PFC stage output voltage; and third control logic that receives periodic output power indications of the AC-DC power supply and uses them to cause the PFC stage to respond to a change in output power of the AC-DC power supply more quickly than would be achieved by the second control logic.

The PFC stage can be a critical conduction mode (CrCM) boost converter. A significant control signal of the CrCM boost converter is an on time of a boost switch of the CrCM boost converter, and the third control logic can multiply the significant control signal by a ratio between subsequent output power indications of the AC-DC power supply only if the ratio exceeds a first threshold or if a difference between subsequent output power indications of the AC-DC power supply exceeds a second threshold. The PFC stage can be a continuous conduction mode (CCM) boost converter. A significant control signal of the CCM boost converter is a multiplier of the CCM boost converter, and the third control logic can multiply the significant control signal by a ratio between subsequent output power indications of the AC-DC power supply only if the ratio exceeds a first threshold or if a difference between subsequent output power indications of the AC-DC power supply exceeds a second threshold.

DETAILED DESCRIPTION

Figure 1:
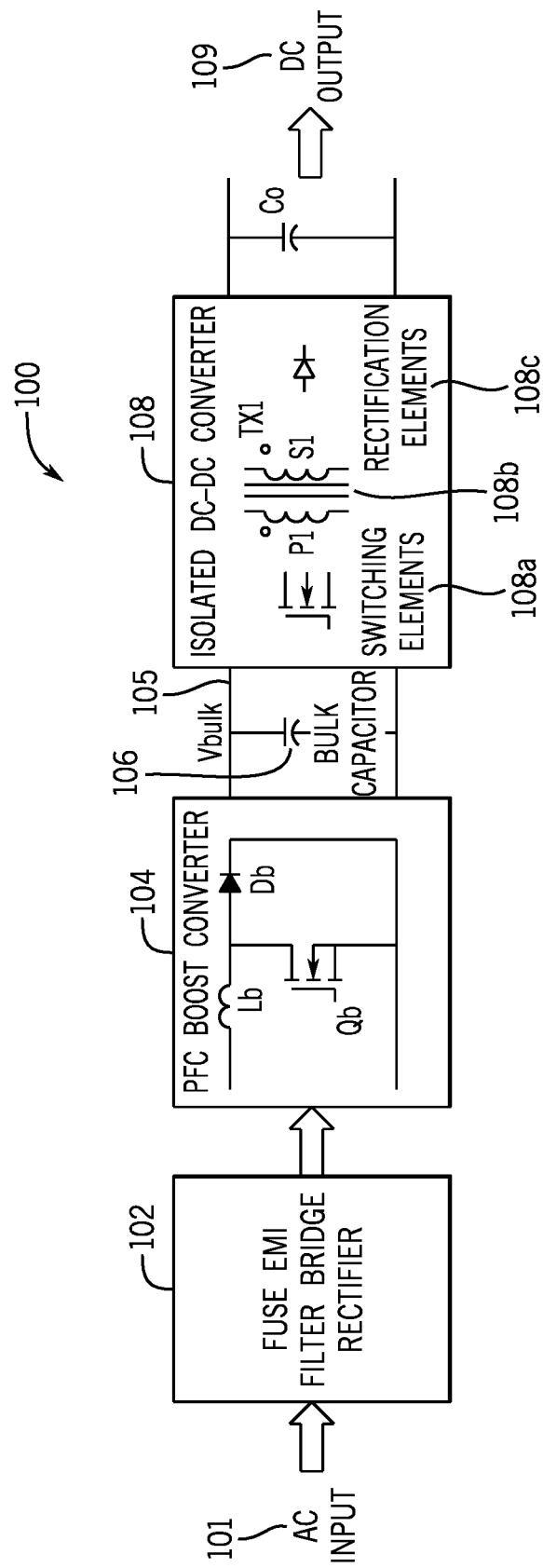
FIG. 1 illustrates a block diagram of an AC-DC power supply with a PFC stage and a DC-DC converter stage.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates a block diagram of an AC-DC power supply 100 with a PFC stage 104 and a DC-DC converter stage 108. More specifically, AC-DC power supply 100 receives an AC input 101. AC input 101 can be provided to various input circuitry 102 that may include one or more of fuse(s) for overcurrent protection, filters for electromagnetic interference (EMI) reduction, and a rectifier that converts the AC input voltage to a DC voltage. Each of these components can be implemented in a variety of ways depending on the requirements of a particular system. For example, the rectifier can be implemented using diodes or active switching devices, e.g., transistors such as field effect transistors (FETs), including metal oxide semiconductor field effect transistors (MOSFETs), etc. Such switching devices can be implemented using any appropriate semiconductor technology, such as silicon (Si), silicon carbide (SiC), gallium nitride (GaN), etc.

The rectified AC input voltage can be provided to PFC stage 104. PFC stage 104 may be implemented as a boost converter. The illustrated boost converter schematic is exemplary, and includes a boost inductor Lb, a boost switch Qb, and a boost diode Db. Various configurations and control strategies for the boost converter are possible, some of which are described in greater detail below. Additionally, component or topology variations are also possible. As but one example of such variations, boost diode Db could be replaced with an active/synchronous rectifier device such as a MOSFET to provide increased efficiency. As with input circuitry 102, the semiconductor devices of PFC stage 104 can be implemented using any of a variety of semiconductor devices using any suitable semiconductor technology. One aspect of the control circuitry for PFC stage 104 (discussed in greater detail below) is that it will typically operate with a control loop bandwidth that is somewhat slower than the AC line frequency. For example, an AC mains supply may be 50 Hz or 60 Hz depending on the region of the world, while the PFC loop may operate at a 10-20 Hz bandwidth to provide the requisite degree of input current shaping, i.e., an input current that is substantially sinusoidal and substantially in phase with the AC input voltage. In this context, "substantially" means that the input current need not be perfectly sinusoidal nor perfectly in phase with the AC input voltage, but rather "close enough" to meet a desired performance level specified for the system by design, regulatory, or other constraints.

The output of PFC stage 104 can be coupled to the input of DC-DC stage 108 by an intermediate DC bus 105, which can be supported by a bulk capacitor 106. Among other functions and as described in greater detail below, bulk capacitor 106, and specifically the energy stored therein, can be used to "make up" a difference in the power output of PFC stage 104 and DC-DC stage 108 caused by their different response times to output load transients and other phenomena.

DC-DC stage 108 may have a variety of topologies. As described above, DC-DC stage 108 could even be a multi-stage converter, although it is illustrated and described herein as a single stage. In some embodiments, DC-DC stage 108 could be, but need not necessarily be, an isolated DC-DC converter. To that end, the components of DC-DC stage 108 are illustrated herein as including switching elements 108a, isolation transformer 208b, and rectification elements 108c. Depending on the specific topology multiple instances of each type of device may be provided and may be interconnected in a variety of ways. Additionally, such devices themselves may take a variety of forms. For example, switching elements 108a can be any of a variety of semiconductor switching devices implemented using a variety of semiconductor technologies. Likewise, isolation transformer(s) 208b may have a variety of constructions, including by way of illustration and not limitation, one or more wire-wound coils, one or more PCB coils, air cores or cores made from magnetic material such as ferrite or magnetic steels, etc. Similarly, rectification elements 108c can also be implemented as a variety of switching devices implemented using a variety of semiconductor technologies. DC-DC stage 108 may also include control circuitry (described in greater detail below) that produces a regulated output voltage that is provided to DC output 109. As an aside, DC output 109 can be the output of power supply 100, and an output filter capacitor Co may be provided to stabilize and reduce ripple on the output voltage. In any case, the control circuitry of DC-DC stage 108 may implement a control loop that operates somewhat faster than the control loop of PFC stage 104. This can allow DC-DC stage 108 to respond quickly to changing power requirements of the load powered by the power supply. As a non-limiting example, the DC-DC stage control loop may operate with a bandwidth on the order of 10 to 100 kHz.

As described above, an important function of PFC stage 104 can be to draw power from AC input 101 such that the input current has substantially the same wave shape as the input voltage, (i.e., sinusoidal) and the input voltage and input current are substantially in phase. The utility grid may operate at a relatively low frequency such as 50 Hz or 60 Hz. Thus, the voltage regulation loop of PFC stage 104 may be very slow, e.g., at a frequency of 10~20 Hz. Therefore, the voltage control loop of PFC stage 104 may be inherently slow to respond to sudden and large changes in output power of converter 100. If the powered system demands a large increase in output power at rapid rate, DC-DC stage 108 can meet this demand by virtue of having a relatively faster control loop. However, PFC stage 104 may not be able to respond rapidly due to its relatively slower voltage control loop. As a result, DC-DC stage 108 must borrow the power from the energy stored in bulk capacitor 106. This may cause a significant voltage dip on Vbulk, the voltage of the intermediate DC bus rail 105. In some applications, this may result in the use of a higher capacitance and physically larger bulk capacitor, which consumes space and impacts cost.

In some power supply designs, a certain energy storage in the bulk capacitor may be specified or required to maintain continuous system operation when line voltage drops e.g., for one-half or a full line cycle. This is sometimes known as the "hold-up time". Such designs may include well-defined input voltage ranges for the DC-DC stage 108. The intermediate DC bus voltage level may also be set near the upper operating input voltage range of the DC-DC stage 108 such that it can keep operating as the intermediate DC bus voltage Vbulk starts to drop due to discharge of the bulk capacitor upon loss of AC input. For example, if the DC-DC stage 108 is designed to operate over input voltage range of 300V to 400V, then the intermediate DC bus voltage Vbulk might be set at 400 VDC nominal. During the loss of AC input voltage, bulk capacitor 106 can thus have sufficient stored energy to continue delivering load power during the hold-up time as it discharges from 400V to 300V (as an example). In designs that aim for a hold up time of one-half to one line cycle, the selected capacitor can meet the sudden step load conditions as described above, even if intermediate DC bus voltage Vbulk dips from 400V to 350V, or even lower.

However, in some applications, it might be preferable that PFC stage 104 and DC-DC stage 108 operate at lower intermediate bus voltage level to improve efficiency in various operating conditions. For example, computer or server power supplies might need to meet a certain efficiency at 50% rated load at nominal line voltage of 230Vac. Design architects may prefer to reduce the PFC stage output voltage from 400V to ~350V to achieve this. This may offer significant efficiency improvement for load levels below 50% to meet various efficiency requirements in high line voltage conditions. However, such systems may also need to support sudden system load steps, e.g., an output load step from ~50% to ~100%. When the system is operating at low power (e.g., below 50% power) and at a reduced intermediate bus voltage Vbulk level (e.g., 350V), a sudden load step (e.g., from 50% to 100%) can cause the intermediate DC bus voltage Vbulk to dip significantly. (The numerical values recited in above are merely one example chosen for illustrative purposes.) It may be important to prevent the intermediate bus voltage Vbulk from dropping below the minimum input operating voltage of DC-DC stage 108, e.g., 300 VDC. This might be achieved by providing bulk capacitor(s) 106 that have adequate energy storage to maintain the intermediate DC bus voltage Vbulk above 300V until the relatively slower control loop of PFC stage 104 responds to the load change and brings the intermediate DC bus voltage Vbulk back to 400V. Such a design may use a bulk capacitor 106 that may be larger than what would otherwise be needed to meet the hold-up time or the life requirement.

In addition, with the intermediate bus voltage Vbulk sitting at a nominal voltage of 400V (again merely an illustrative example), a very different situation can happen during sudden step unload. If the DC-DC stage 108 suddenly drops the power from 100% to a very low level, say 10%, it can cause a large voltage overshoot on intermediate DC bus voltage Vbulk. The PFC stage 104, due to its relatively slower control loop speed may continue to deliver 100% power, and the delivered power will be dumped in the bulk capacitor 106. The voltage overshoot might be as high as 440V (for example), requiring the use of 450V rated capacitors, which may be more expensive and/or physically larger than capacitors with a slightly lower voltage rating sufficient for operating voltages other than this exemplary overshoot voltage.

Described below is a methodology to address above-described limitations of AC-DC converters implementing PFC stages 104 by employing intelligent dynamic adjustment to the PFC stage control parameters through the use of smart digital control.

Figure 2:
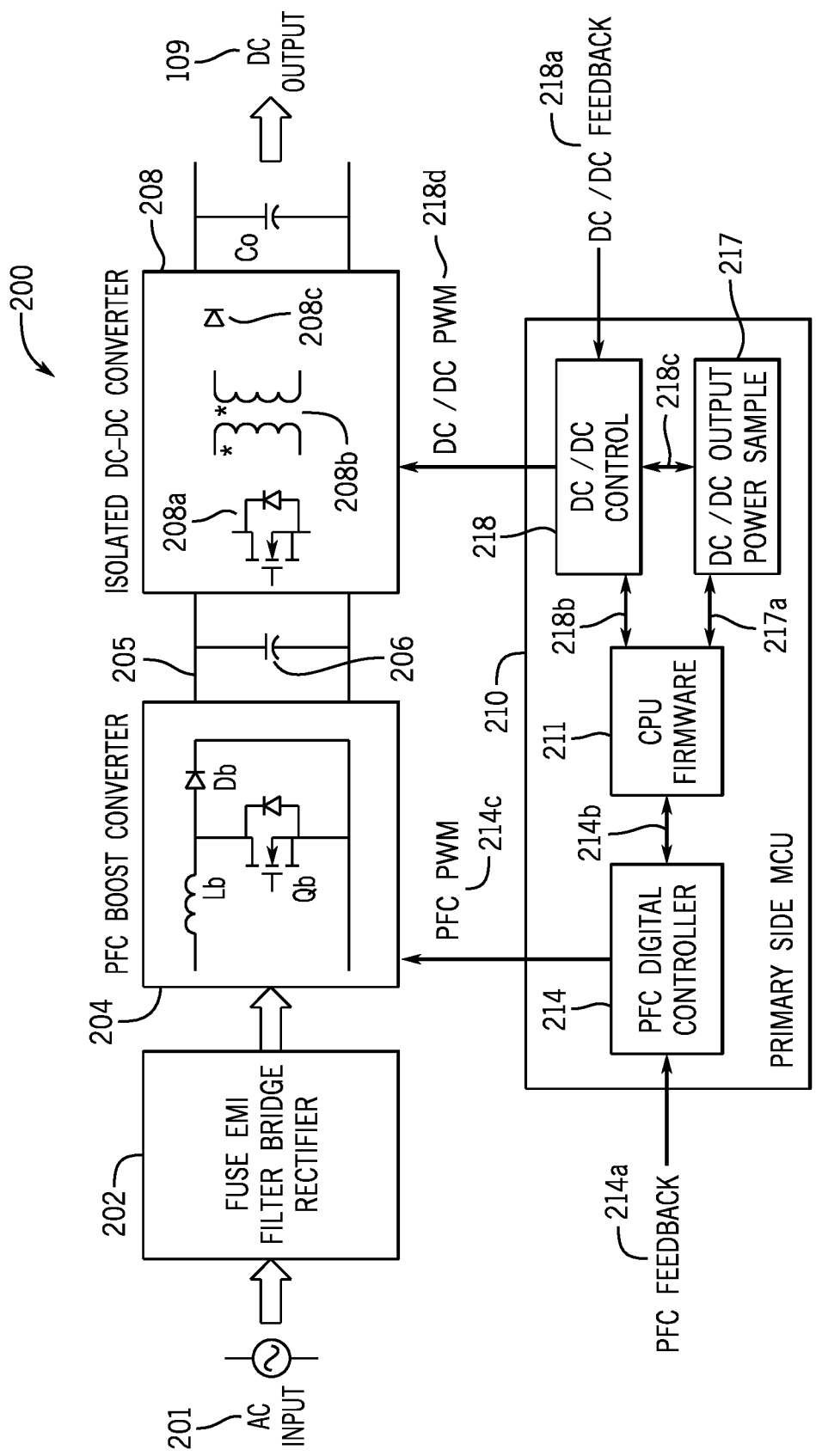
FIG. 2 illustrates a block diagram of an AC-DC power supply with a PFC stage and a DC-DC converter stage with digital control.

FIG. 2 illustrates a block diagram of an AC-DC power supply 200 with a PFC stage 204 and a DC-DC converter stage 208 with digital control 210. The power stage components of AC-DC power supply 200 can be as described above with respect to AC-DC power supply 100, with similar reference numbers used to identify corresponding components. Control of AC-DC power supply 200 may be implemented with a digital controller 210, described in greater detail below. Digital controller 210 may be implemented using a microcontroller or other suitable programmable control device. The basic control architecture of PFC stage may be the same as the traditional methodology. Likewise, the basic control architecture of DC-DC stage 208 may also be the same as the traditional methodology.

More specifically, digital controller 210 can include a PFC digital controller 214 that can receive PFC feedback signals 214a (e.g., intermediate DC bus voltage Vbulk) and produce PFC PWM signals 214c that drive the switching device(s) (e.g., boost switch Qb) to produce a desired output, e.g., a regulated output voltage that is the voltage of intermediate DC bus 205 (supported by bulk capacitor 206). PFC digital controller 214 may also send and receive additional signals 214b via microcontroller firmware 211 that can alter the PFC PWM signals 214c as described in greater detail below. Likewise, digital controller 210 can include a DC-DC digital controller 218 that can receive DC-DC feedback signals 218a (e.g., output voltage and current) and produce DC/DC PWM signals 218d that drive the switching device(s) 208a of DC-DC stage 208 to produce the desired output voltage and/or current. DC-DC digital controller 218 may also send and receive additional signals 218b via microcontroller firmware 211 and/or DC-DC output power sampler 217 that can alter the PFC PWM signals 214c as described in greater detail below.

Digital controller 210 can thus be distinguished from prior art controllers at least in part by the mechanism that detects changes in the output power of the power supply 200 and uses that information to do fast corrections to the PFC digital controller 214. For example, DC-DC power sampling block 217 can be implemented as part of digital controller 210 and can receive output voltage, current, and or power measurements from DC-DC digital controller 218 either directly (via signals 218c) or indirectly via the controller firmware 211 and produce output power measurements that can be passed (via signals 217a) to controller firmware 211 and on to PFC digital controller 214 (via signals 214b) to modify operation of PFC stage 204 more quickly than would be achieved by a conventional control loop.

Also described below is a technique of computing control loop parameter(s) to quickly move the output power of PFC stage 204 very close to the actual level required, leaving only minor stabilization for the slower control loop to perform. A parameter that the proposed control technique needs is a knowledge of a significant change in the output power of the DC-DC stage 208. This information can be derived directly or indirectly, and FIGS. 3A-3C illustrate exemplary configurations that can derive this information.

Figure 3A:
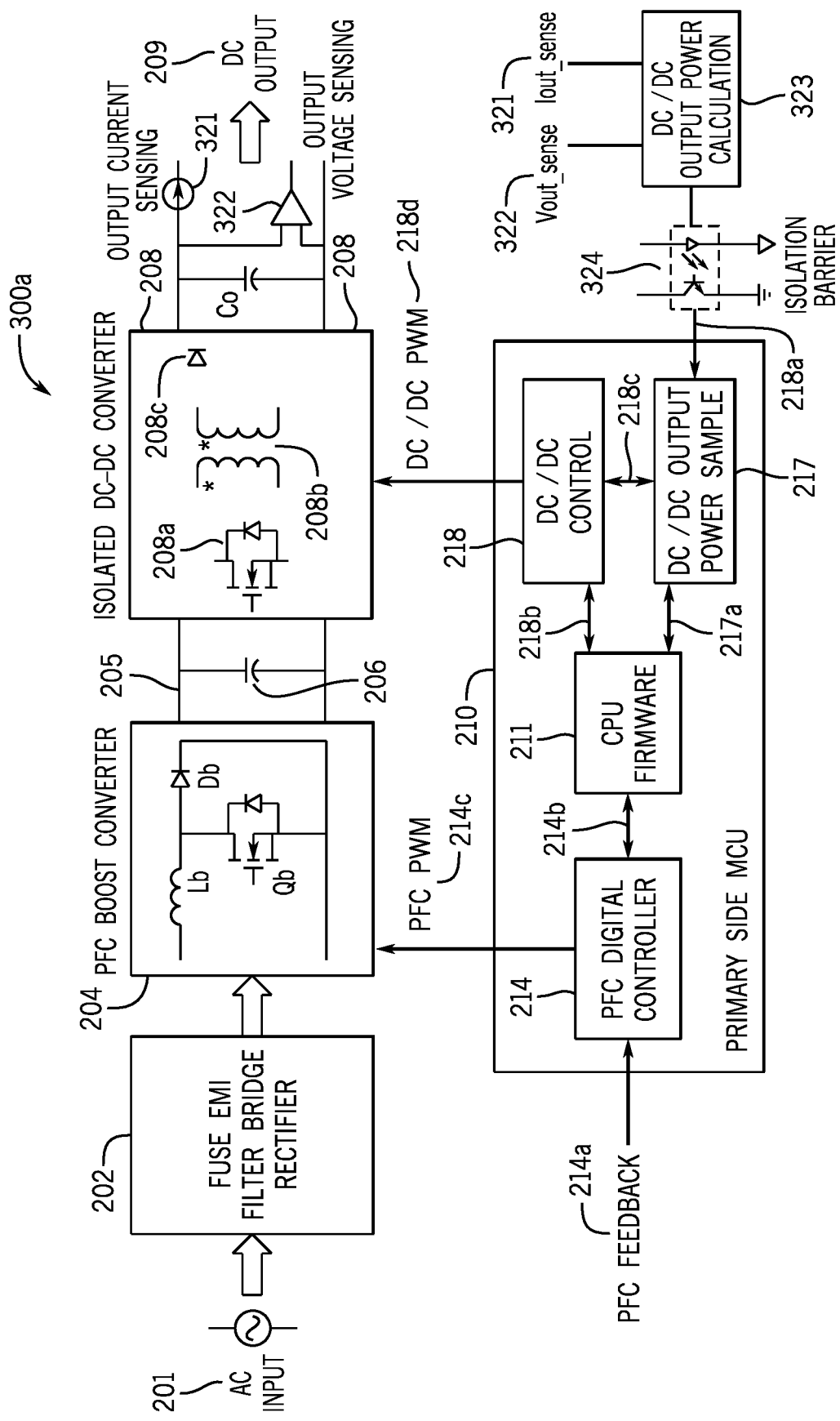
FIG. 3A illustrates a block diagram of an AC-DC power supply with a PFC stage and a DC-DC converter stage with digital control using DC-DC stage output power sensing.

FIG. 3A illustrates a block diagram of an AC-DC power supply 300a with a PFC stage 204 and a DC-DC converter stage 208 and a digital controller 210 using DC-DC stage output power sensing. The power stage and control system components of AC-DC power supply 300a can be as described above with respect to AC-DC power supply 200, with similar reference numbers used to identify corresponding components. FIG. 3A illustrates one way for the controller 210 to obtain information about the output power of AC-DC power supply 300b/DC-DC stage 208. More specifically, the output voltage and current are measured using sensors at the output. Current sensor 321 can be any suitable current sensor, such as a current sense resistor, a Hall effect sensor, etc. Voltage sensor 322 can be any suitable voltage sensing device, such as the illustrated sensing amplifier. The output voltage signal 322 (same reference used for sensor and sensor output signal for clarity) and output current signal 321 (same reference number used for current sensor and current sensor output signal for clarity) can be provided to a DC-DC output power calculator module 323. The product of the output voltage and output current gives output power.

In the illustrated example, the power calculation takes place on the output side of AC-DC power supply 300a, so the resulting power signal 218a may be provided to the digital controller 210 (and more specifically the DC-DC output power sampler 217) via an isolation barrier 324. In other embodiments, the output voltage and current signals could be provided to the controller individually via independent isolation barriers, with the multiplication taking place in the controller. Additionally, the multiplication may take place in either the analog domain (in which case the resulting power signal may be sampled to provide power samples) or in the digital domain, in which case the resulting voltage and current samples can be multiplied together to produce power samples. If DC-DC stage 208 is designed/controlled as a voltage source, then only output current need be measured to generate a signal that is proportional to the output power. In any case, the output power information can be transferred to the primary side digital controller 210 through an isolation barrier that provides galvanic isolation. One way to do so is to send such a signal in the form of digital communication. Various standard protocols such as I2C or UART can be used for this purpose. Even galvanically isolated pulse transformers can also be used to serve this purpose. These and other methods of transferring signals across the isolation barrier could all be used depending on the particular application. In any case, the measured output power can be provided to DC-DC controller 218 (via 218c), CPU firmware 211 (via 217a) and/or PFC digital controller 214 (via 214b). The measured output power can be used to adjust operation of PFC stage 204 as described in greater detail below.

Figure 3B:
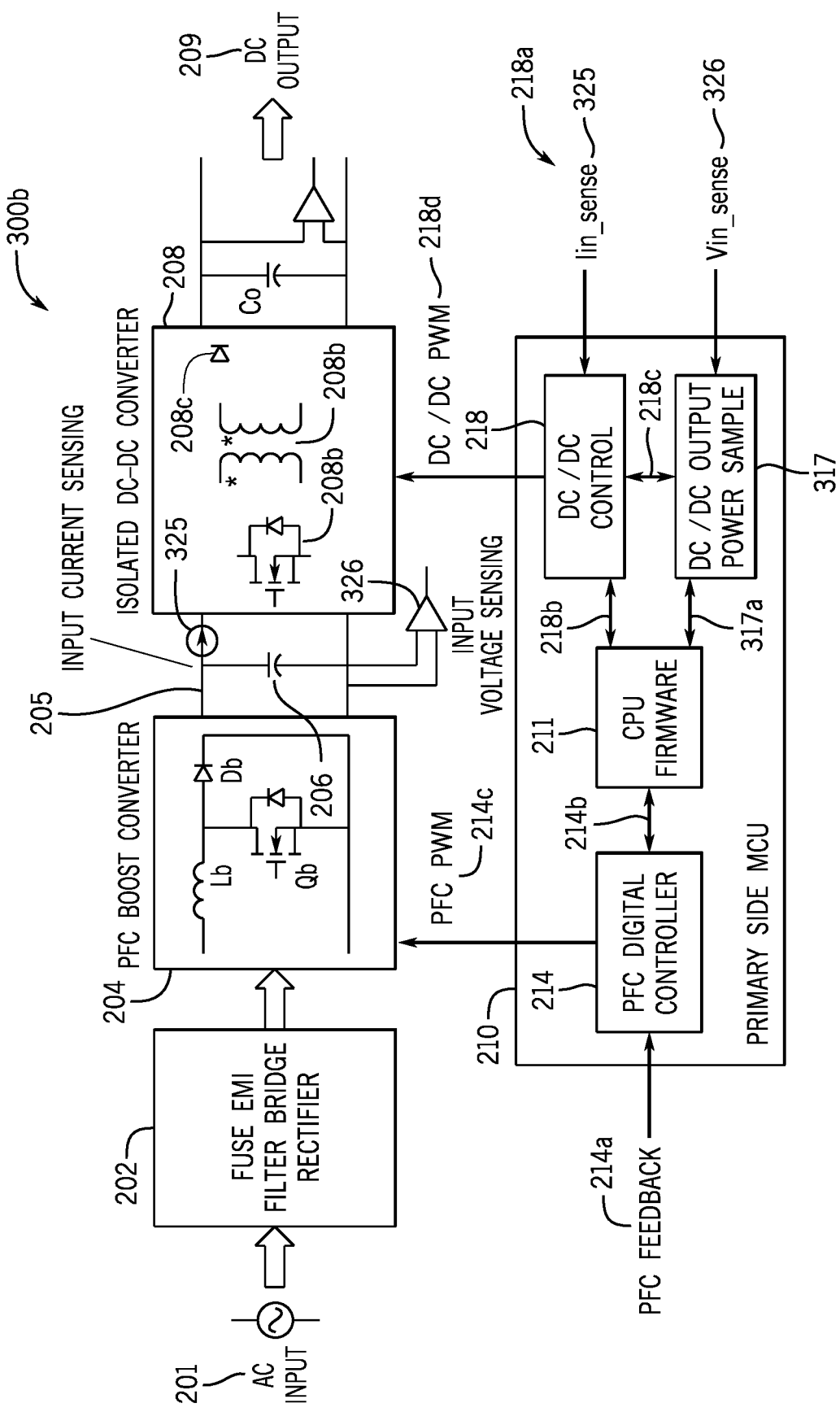
FIG. 3B illustrates a block diagram of an AC-DC power supply with a PFC stage and a DC-DC converter stage with digital control using DC-DC stage input power sensing.
Figure 3C:
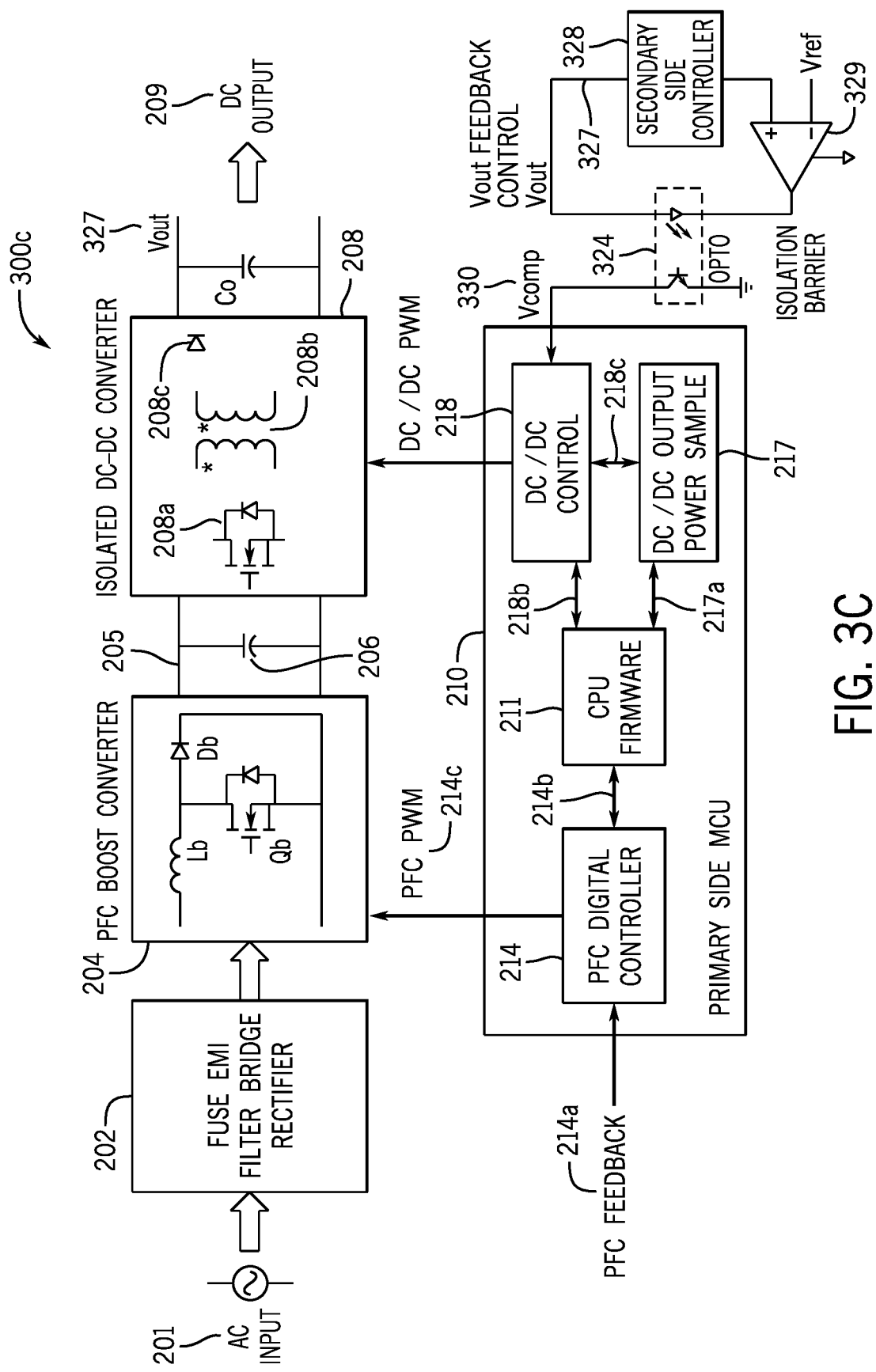
FIG. 3C illustrates a block diagram of an AC-DC power supply with a PFC stage and a DC-DC converter stage with digital control using DC-DC control parameter monitoring for power sensing.

FIG. 3B illustrates a block diagram of an AC-DC power supply 300b with a PFC stage 204 and a DC-DC converter stage 208 with digital controller 210 using DC-DC stage input power sensing. The power stage and control system components of AC-DC power supply 300b can be as described above with respect to AC-DC power supply 300a, with similar reference numbers used to identify corresponding components. FIG. 3B illustrates a simplified schematic of measuring input current and voltage of the DC-DC stage 208. More specifically input current sensor 325 measures the input current of DC-DC stage 208, and input voltage sensor 326 measures the input voltage of DC-DC stage 208. The resulting input current signal 325 and voltage signal 326 (same reference numbers used for clarity) can be provided to DC-DC input power calculation module 217, which can be implemented by digital controller 210. The respective sensors may be any suitable type of sensor, as described above. The product of the input current and voltage gives input power to the DC-DC stage 208. Because such DC-DC converters operate at very high efficiency, e.g., more than 95%, this measured information provides adequate information about the output power of the converter. In any case, the measured input power can be provided to DC-DC controller 218 (via 218c), CPU firmware 211 (via 317a) and/or PFC digital controller 214 (via 214b). The measured input power can be used to adjust operation of PFC stage 204 as described in greater detail below.

FIG. 3C illustrates a block diagram of an AC-DC power supply 300c with a PFC stage 204 and a DC-DC converter stage 208 with digital controller 310 using DC-DC control parameter 327 for power sensing. The power stage and control system components of AC-DC power supply 300b can be as described above with respect to AC-DC power supply 300c, with similar reference numbers used to identify corresponding components. The configuration of FIG. 3C can be used when control for the DC/DC stage 208 is on the primary side of the system, i.e., on the same side of the galvanic isolation as that of the PFC stage 204. An error amplifier 329 can compare the regulation parameter from a secondary side controller 328 on the output side with a programmed reference Vref and provide the error signal Vcomp/330 to the primary side DC-DC controller 218 through an isolation barrier, e.g., using opto-coupler 324. Alternately, other ways of sending the error signal through the isolation may also be used, such as a digital communication line. Primary side DC-DC controller 218 can increase or decrease the power delivered by DC-DC stage 208 to regulate the desired output parameter (e.g., output voltage and/or current).

The interpretation of the error signal on the primary side can be different for different topologies and can provide information about output power, when processed appropriately. For example, if DC-DC 208 employs a boundary conduction mode or transition mode buck converter variant with cycle-by-cycle peak current control, then the error signal can be considered to be closely proportional to the output power. Alternatively, if DC-DC stage 208 employs an LLC topology, then the error voltage controls the operating frequency, which is a function of output power as well as input voltage of DC-DC stage 208. In such case, a look-up table can be provided that maps the error voltage level, cross referenced to the input voltage, allowing the controller to decode the output power level. In any case, the measured or inferred output power can be provided to DC-DC controller 218 (via 218c), CPU firmware 211 (via 217a) and/or PFC digital controller 214 (via 214b). The measured output power can be used to adjust operation of PFC stage 204 as described in greater detail below.

Another power measurement technique that may be used is to measure the output power delivered by the PFC stage 204 As the output of PFC stage 204 is connected to intermediate bus 205, which is also coupled to the input of DC-DC stage 208, this technique can be considered as generally equivalent to the configuration illustrated above with respect to FIG. 3B. Various other power measurement techniques known to those skilled in the art can additionally or alternatively be used to derive knowledge of the output power for use by the primary side digital controller 210 as described in greater detail below.

In any case, digital controller 210 can monitor at least two parameters to achieve improved control responsiveness of PFC stage 204 as described herein. One such parameter is the PFC stage input current control parameter, and the other is the parameter that corresponds to the output power of the converter. The PFC input current control parameter depends upon the implementation of the PFC boost converter. Two exemplary implementations of PFC stage 204 are described below, one is a Critical Conduction Mode PFC Boost Converter (FIGS. 4A-4C), and the other is a Continuous Conduction Mode PFC Boost Converter (FIGS. 5A-5B).

Figure 4A:
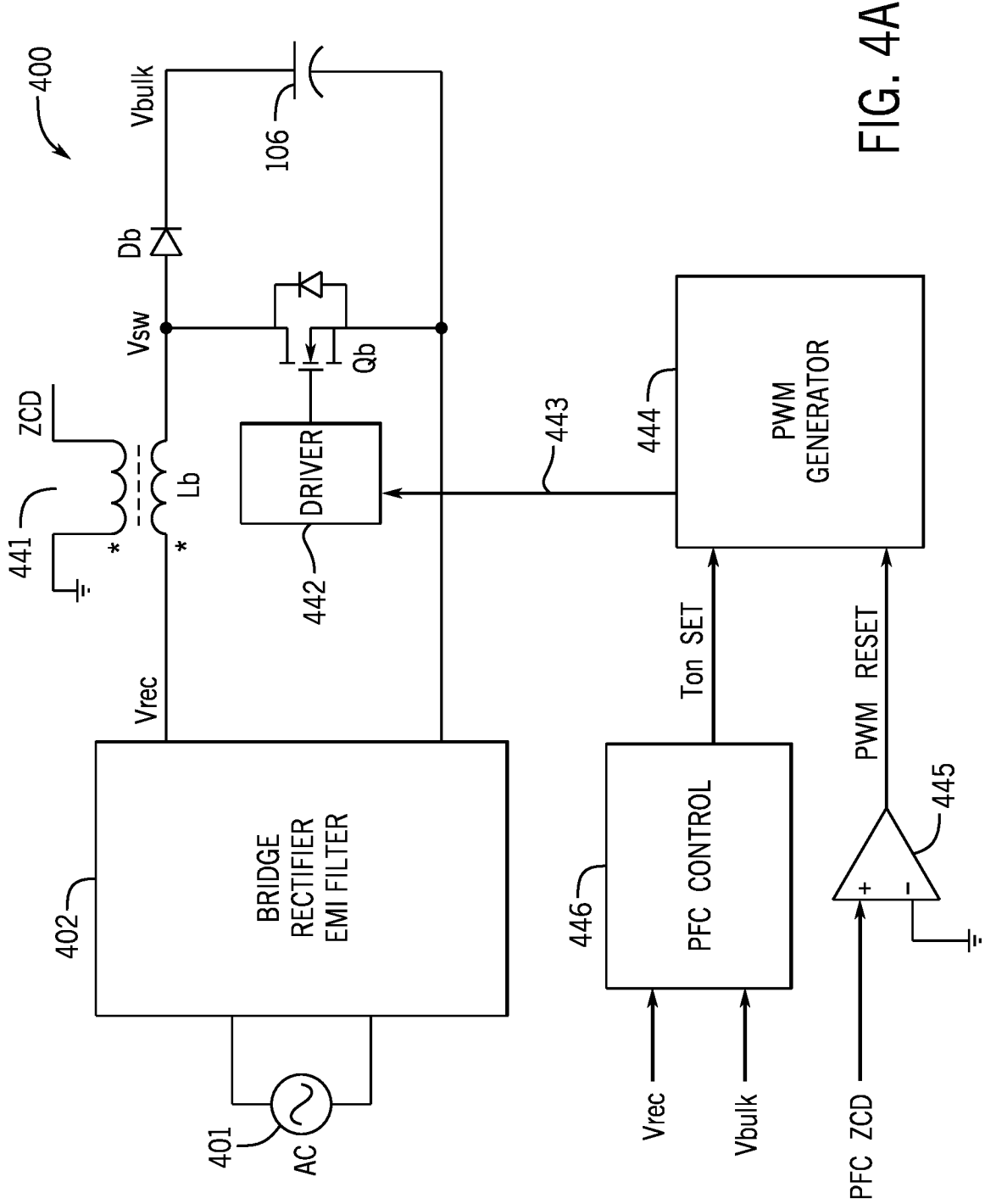
FIGS. 4A-4C illustrate a critical conduction mode PFC stage and associated waveforms.
Figure 4B:
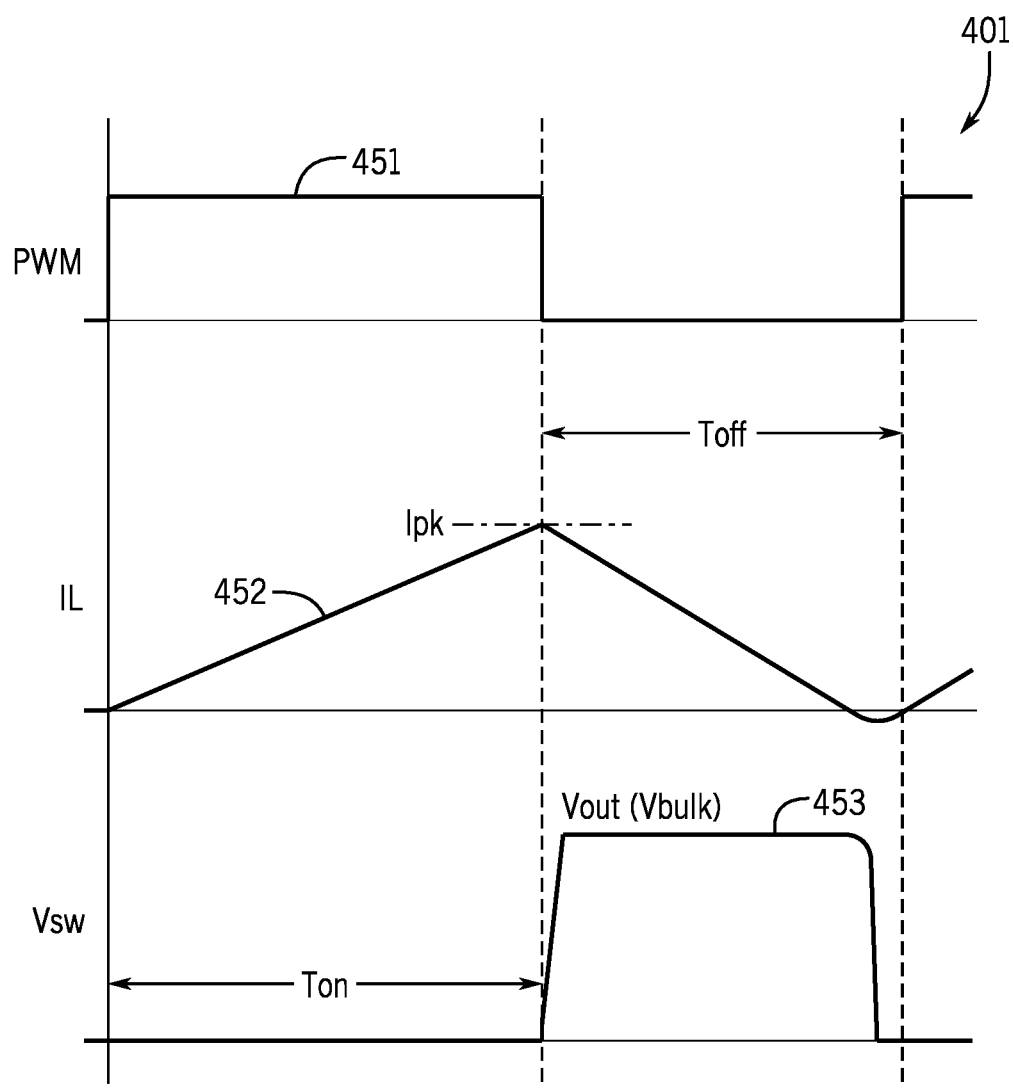
Figure 4C:
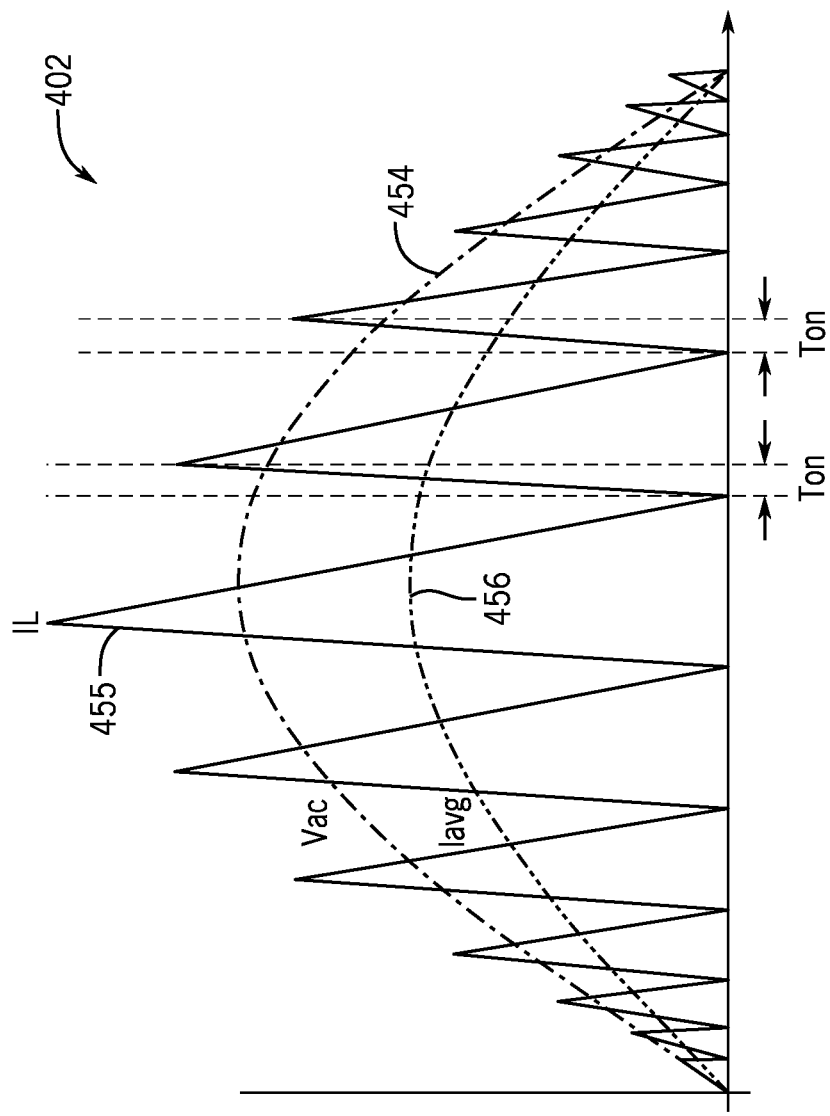
Figure 5A:
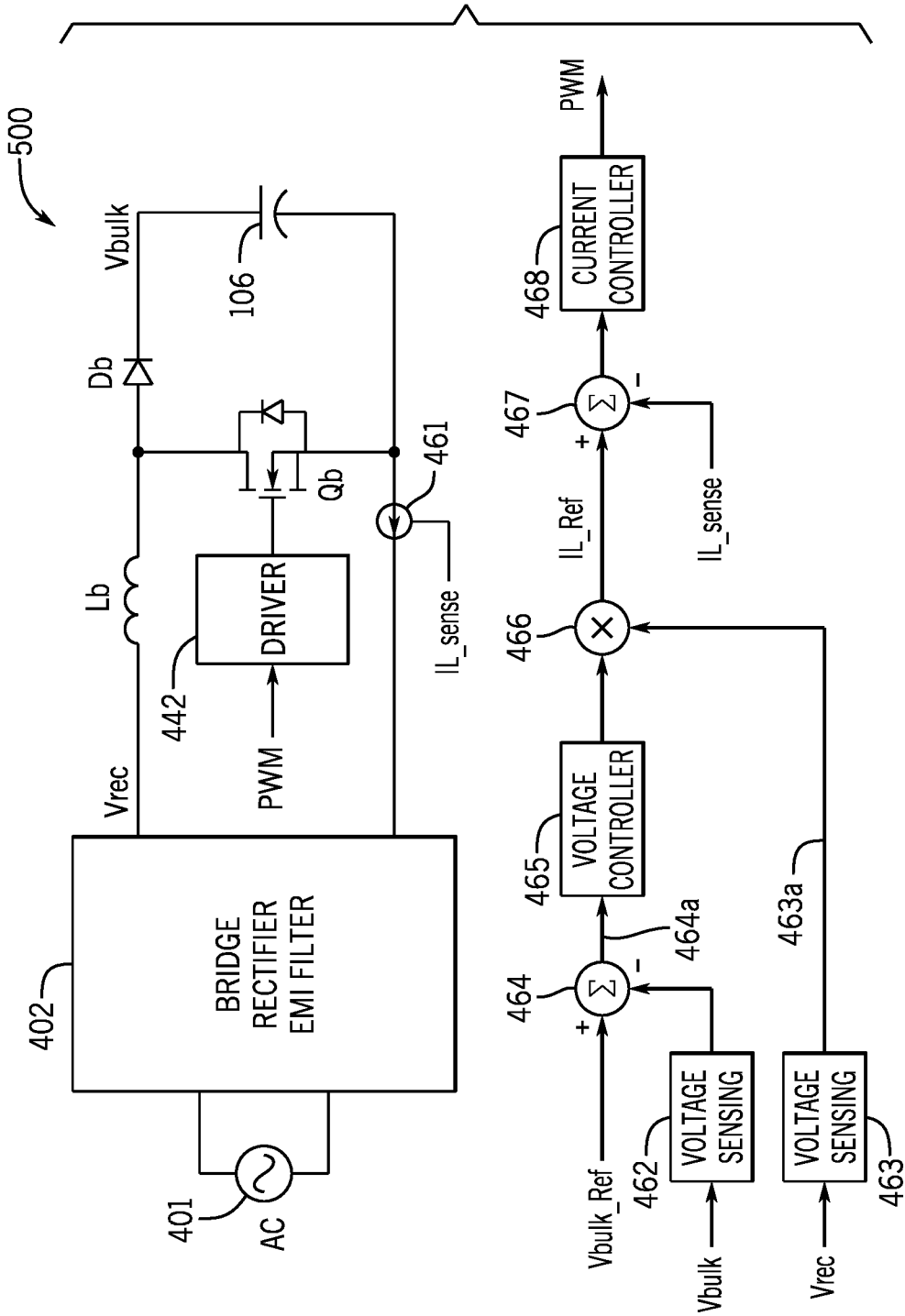
FIGS. 5A-5B illustrate a continuous conduction mode PFC stage and associated waveforms.
Figure 5B:
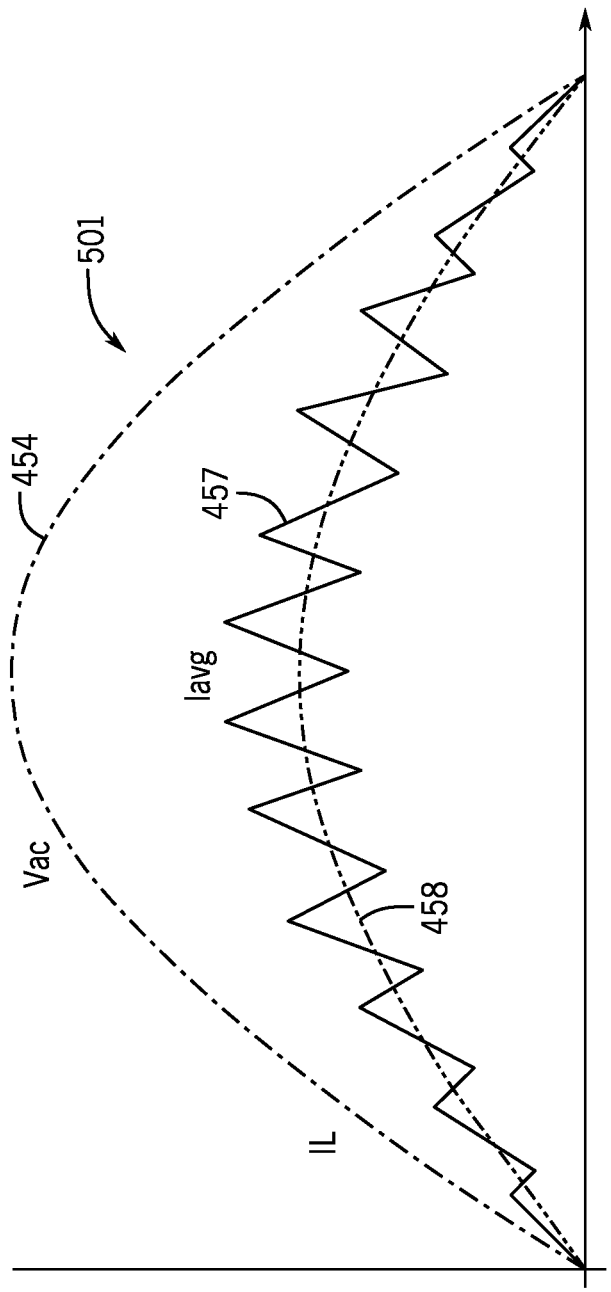

FIGS. 4A-4C illustrates a critical conduction mode PFC stage 400 and associated waveforms 401, 402. This configuration may also be known as boundary mode or transition mode PFC boost converter. Such implementations may be preferred in relatively lower power applications because of the relative simplicity of implementation. An AC input source 401 is coupled to the boost/PFC converter by rectifier and optional EMI filter 402 (like 102 described above with respect to FIG. 1). The boost power switch Qb can be controlled so that the boost inductor Lb charges to a peak current level Ipk (FIG. 4B) from zero and then completely discharges to zero current level. The inductor current IL (452; FIG. 4B) can be forced to rise as soon as it drops to zero, except some delay to allow switching of the boost switch Lb at the depth of the voltage valley across it, for the purpose of reducing capacitive losses. Thus, boost inductor Lb can be operating at the boundary of continuous conduction mode (CCM) and discontinuous conduction mode (DCM), in other words in boundary or critical conduction mode (CrCM). The inductor current IL or the voltage across the inductor can be sensed to achieve the desired boundary mode operation. Because sensing current in the inductor or voltage across may be complicated by high voltage operation and/or concern of power loss, an auxiliary sense winding 441 can be wound on the same inductor core for easier sensing of inductor discharge instance, i.e., zero crossing detection (ZCD). CrCM PFC operation may result in higher reflected input ripple current, and thus a larger differential input filter (402) may be provided to meet conducted emissions requirements. However, this trade-off may be acceptable in favor of simplicity and lower cost in low power applications.

Various control techniques can be used for CrCM PFC operation, but many such techniques operate boost switch Lb in "Fixed ON Time-Variable OFF Time" mode over an entire cycle of the AC input voltage. This is essentially a variable frequency operation. The ON time (Ton; FIG. 4B) of boost switch Lb can be substantially constant over the AC cycle, but the off time (Toff; FIG. 4B) can be relatively short near the bottom of the sine wave voltage, near zero crossing. As the line voltage (Vac, FIG. 4C) increases along the sinusoidal path, the off time becomes progressively longer up to the peak line voltage. Then it follows the opposite trend as the line voltage falls from the peak towards zero. The increasing off time corresponds to the decreasing negative slope of the inductor current pulses 455 as illustrated in FIG. 4C.

In FIG. 4A, the PFC control block 446 generates the required Ton setting according to Vbulk feedback control. In other words, the rectified input voltage Vrec and the PFC output/intermediate bus voltage Vbulk are provided as inputs to PFC control block 446, which generates the Ton SET signal. The PWM turn on timing (PWM Reset) is obtained from boost inductor aux winding 441 from the zero-crossing detection (ZCD), via comparator 445. The Ton SET and PWM Reset signals can be provided to a PWM Generator 444, that can generate PWM signals 443, which can be provided to boost switch driver 442, which provides the gate drive signal to boost switch Qb.

FIG. 4B shows the typical switching cycle 401 via three waveforms. PWM waveform 451 is the gate drive signal for boost switch Qb. When this signal is high, boost switch Qb is turned on, and when this signal is low, boost switch Qb is turned off. Boost inductor current (IL) waveform 452 illustrates the linear increase in boost inductor current to the peak value Ipk during Ton, and the linear decrease in boost inductor current to zero during Toff. Finally, Vsw waveform 453 illustrates the voltage across boost switch Qb (i.e., the voltage at the junction of boost inductor Lb, boost diode Db, and boost switch Qb). This voltage is zero when boost switch Qb is turned on (during Ton), rapidly rising to the output voltage Vbulk at the beginning of Toff, and decreasing to zero as the boost inductor current IL reaches zero just before the end of Toff. (This allows for zero voltage switching to improve efficiency, as briefly mentioned above.

Thus, the main control parameter of CrCM Boost PFC is the ON time set by the PFC control block 446. The Ton time control can be implemented with a general digital PI (proportional-integral) controller. Through feedback, the PI controller can automatically set the correct Ton time that regulates Vout to target value. This PFC voltage control loop essentially regulates Vbulk correctly through power balance and hence the bandwidth is very low. Thus, this ON time, remains substantially constant if the input voltage and output power are in steady state.

FIG. 4C shows plots 402 illustrating exemplary PFC inductor current IL/455, average input current Iavg/456, and input voltage Vac/454 waveforms in steady state operation when Ton is constant during a half AC cycle. The illustrated switching frequency is reduced for illustrative purposes, meaning that there would normally be many more inductor current pulses during the AC line cycle. As the inductor current goes from 0 to Ipk during on time, and back to 0 during off time, the average current is given by:

$$I_{avg} = \frac{1}{2}I_{pk} = \frac{1}{2} \cdot \frac{V_{in} \cdot T_{on}}{L}$$

Thus, the average current of one switching cycle is proportional to the input voltage Vin for a given on time. Hence, the Iin is proportional to Vin and realizes the PFC function.

FIGS. 5A-5B illustrates a continuous conduction mode (CCM) PFC stage 500 and associated waveforms 501. This architecture may be preferred at relatively higher power levels, as it can keep the peak input ripple current lower and may make it easier to limit the conducted emissions. This configuration can also provide excellent power factor over wide range of load levels. The power stage configuration of CCM PFC stage 500 is generally the same as CrCM PFC stage 400, described above, and similar reference numbers are used to identify corresponding components. The different control implementation is described in greater detail below.

One possible operating methodology of a CCM PFC employs average current mode control. In other words, the converter can employ an inner current regulation loop in conjunction with outer voltage regulation loop, as depicted in the lower portion of FIG. 5A. The control circuit takes a sample (via sensing block 463) of the rectified AC input voltage Vrec to generate a current reference 463a. This reference can be proportional to the input voltage. Then it regulates the input current to follow the same waveshape as the sample, but the amplitude of the current is proportional to the power level. A voltage regulation loop senses the intermediate bus rail voltage Vbulk (via sensing block 462) which is subtracted (block 464) from the intermediate bus voltage reference signal Vbulk_Ref) to generate an error signal 464a. This error signal, also known as "Multiplier", is multiplied (block 466) by the current reference 463a derived from the rectifier input voltage Vrec to set the actual control reference IL_Ref of the current regulation loop. Current regulation loop compares (block 467) the sensed input current IL_sense (derived from current sensor 461) with sinusoidal current control reference IL_Ref and modulates the duty cycle of the boost switch (PWM) to achieve the average input current regulation. Thus, for a fixed input AC voltage, the multiplier will be proportional to the output power.

FIG. 5B illustrates waveforms 501 associated with a CCM PFC stage. Input AC voltage Vac waveform 454 illustrates a half cycle of the AC input voltage. Boost inductor current IL waveform 457 illustrates the instantaneous inductor current, which increases when boost switch Qb is turned on and decreases when boost switch Qb is turned off (as described above with respect to FIG. 4B). Finally, average current Iavg waveform 458 is sinusoidal in shape and tracks the input voltage Vac.

As described above with respect to FIGS. 4A-4C, for a CrCM boost/PFC and for a fixed input voltage, a significant control parameter for input current regulation is the "Fixed ON Time" of the boost switch. Conversely, a significant control parameter in CCM boost/PFC is the "Multiplier" described above. As described herein, the digital controller 210 can modify this significant parameter based on the output power information (which can be derived according to any of a variety of methods, including those described above with respect to FIGS. 3A-3C) while bypassing the outer voltage regulation loop as described below. Further, the significant control parameter can be moved to an appropriate value, very close to the optimum level through digital computations in the digital controller 210.

As an example, consider a DC-DC stage 208 that can adjust the operating conditions within 250 μs upon applying a step load or unload, to bring the operation to steady state condition. For such a system, the digital controller can sample the significant parameter of its PFC stage 204 (i.e., the fixed on time for CrCM or the Multiplier for CCM) and a signal that gives information about the output power (e.g., as discussed with respect to FIGS. 3A-3C). These two signals can be sampled by digital controller 210 at a rate that is slower than the control loop response time of DC-DC stage 208 (i.e., slower than 250 μs in this particular example) and stored. For example, this sampling can be done at one fourth the speed of the DC/DC stage 208 control loop, e.g., every 1 ms. The digital controller can thus sample and store the values of both parameters every 1 ms. Each new sample can replace the previous sample. The ratio of the new output power "P2" to the previous output power "P1" sample can be used to gain understanding the system condition. (Additionally or alternatively, the difference between new output power "P2" to the previous output power "P1" sample can be used to gain understanding the system condition.). For example, this ratio can be greater than one if the load is increasing or less than one if the load is decreasing. If the load is in steady state, both samples will be substantially same, and the ratio will be approximately 1. (Additionally or alternatively, the difference (P2−P1) is a more positive number if the load is increasing or a more negative number if the load is decreasing; if the load is in steady state the absolute value of difference |P2−P1| is minimum.)

A minimum and maximum range for the ratio of P2/P1 can be pre-determined (e.g., Range 1) based on system testing, storage capacity of the bulk capacitor, and other circuit parameters in the given system. If the computed ratio for each sample remains within these set limits, then no action need be taken. (Additionally or alternatively, if the difference (P2−P1) is used to detected system load condition, the absolute value of the difference, i.e. P2−P1 is used to compared with a set limit. If the computed difference is within this set limit, then no action is taken.) The relatively slower outer voltage regulation loop of PFC stage 204 can be allowed to make necessary adjustments to its significant operating parameter in normal course of operation. For example, if it is decided that the ratio range (Range 1) of 0.9 to 1.1, or a +/−10% change in the output power in one sampling period, can be handled by the relatively slower voltage regulation loop of PFC stage 204, then no intervention is necessary.

The sampling and observation of power change can be continued at the 1 ms interval. Each time, new sample data replaces the old sample data.

Alternatively, if the ratio of P2/P1 is outside the set range defined by Range 1, then the significant parameter of PFC stage 204 can be directly multiplied by this ratio at the beginning of next switching cycle of PFC stage 204, which can cause immediate change in the PFC power delivery. This adjustment in the significant control parameter of PFC stage 204 can take the input power draw quite close to the actual system load demand very quickly. Remaining minor correction can be done by the relatively slower outer voltage regulation loop to achieve steady state operation.

Figure 6:
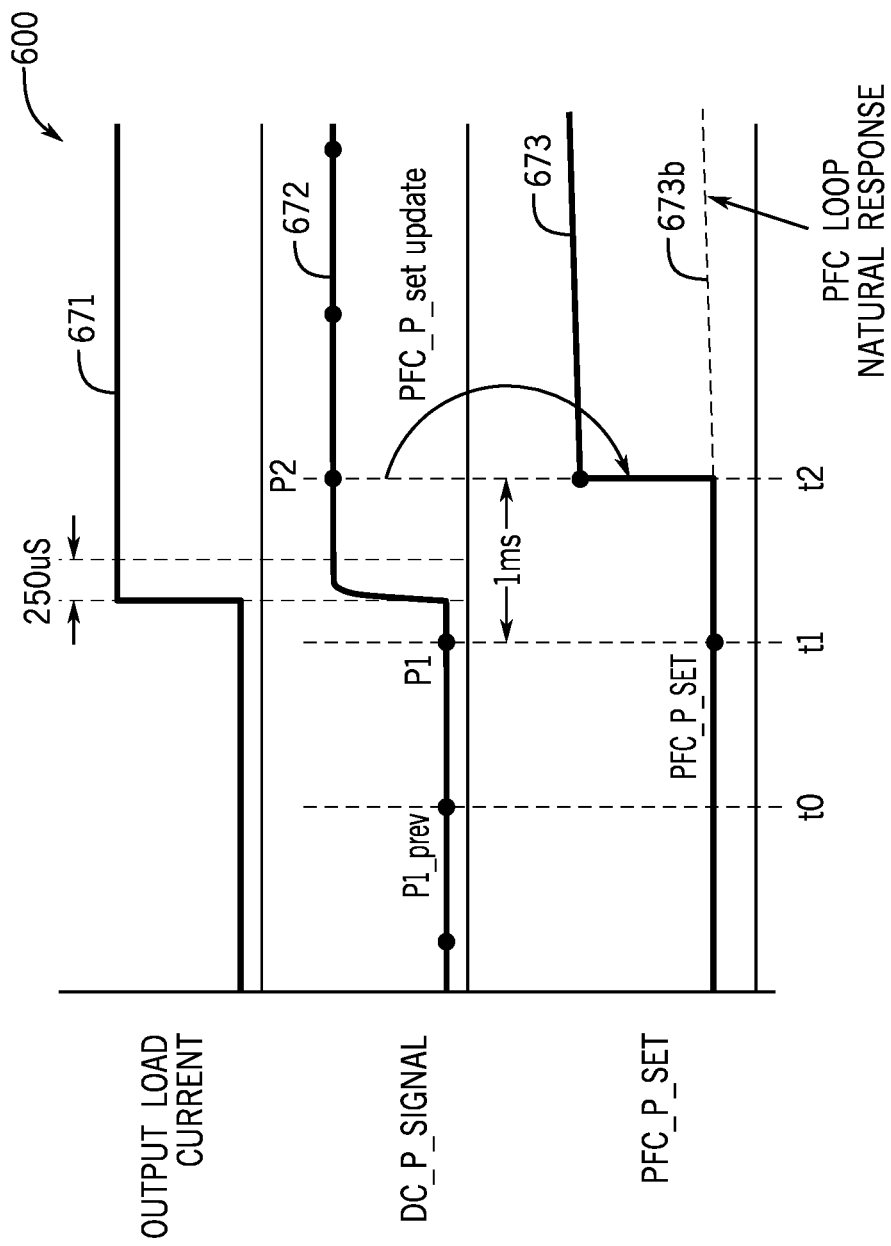
FIG. 6 illustrates load current, DC-DC stage control parameter, and PFC stage control parameter for an output load transient.

FIG. 6 illustrates plots 600 of exemplary load current 671, DC-DC stage control parameter 672, and PFC stage control parameter 673 for an example output load transient. The load transient is indicated by the step in waveform 671 occurring between time t1 and time t2. DC/DC stage power signal sampling (DC_P_signal) illustrates a series of output power samples P1_prev, P1, and P2 taken at times t0, t1, and t2, respectively, at the exemplary 1 ms interval. (This interval could be different, but generally may be slower than the control loop bandwidth of DC-DC stage 208 but higher than the control loop bandwidth of PFC stage 204). PFC stage 204 control parameter PFC_P_set (waveform 673) denotes the significant control parameter for PFC stage. That is, for a CrCM PFC this will be the "Fixed ON Time" of the boost switch, while for a CCM PFC it will be the above-described the "Multiplier". DC_P_Signal 672 denotes the DC-DC stage 208 power output signal generated as described above. After the above-described step load, the DC-DC stage's relatively faster control loop response finishes the correction within the exemplary 250 μs period.

As shown in FIG. 6, the samples P1_prev at t0 and P1 at t1 are virtually identical and thus the sampled DC_P_Signal ratio P1/P1_prev is not outside of a preset Range 1. Thus, no action need be taken at time t1. Following the step load after t1 in this example, an increase in output power is seen at the next sampling instance of t2. At time t2 the sampled DC_P_Signal ratio P2/P1 has exceeded Range1 and indicates a significant step load condition. Digital controller 210 can thus immediately act based on the ratio of P2/P1 to update the significant control parameter PFC_P_Set by sample ratio. Dashed line segment 673*b* illustrates the gradual increase in the PFC stage significant control parameter that would otherwise result without the multiplication operation described above. Instead, the actual PFC significant control parameter immediately increases to close to the required value and may continue to gradually increase as the slower voltage control loop of PFC stage 204 "fine tunes" the output voltage as per normal operation.

Figure 7:
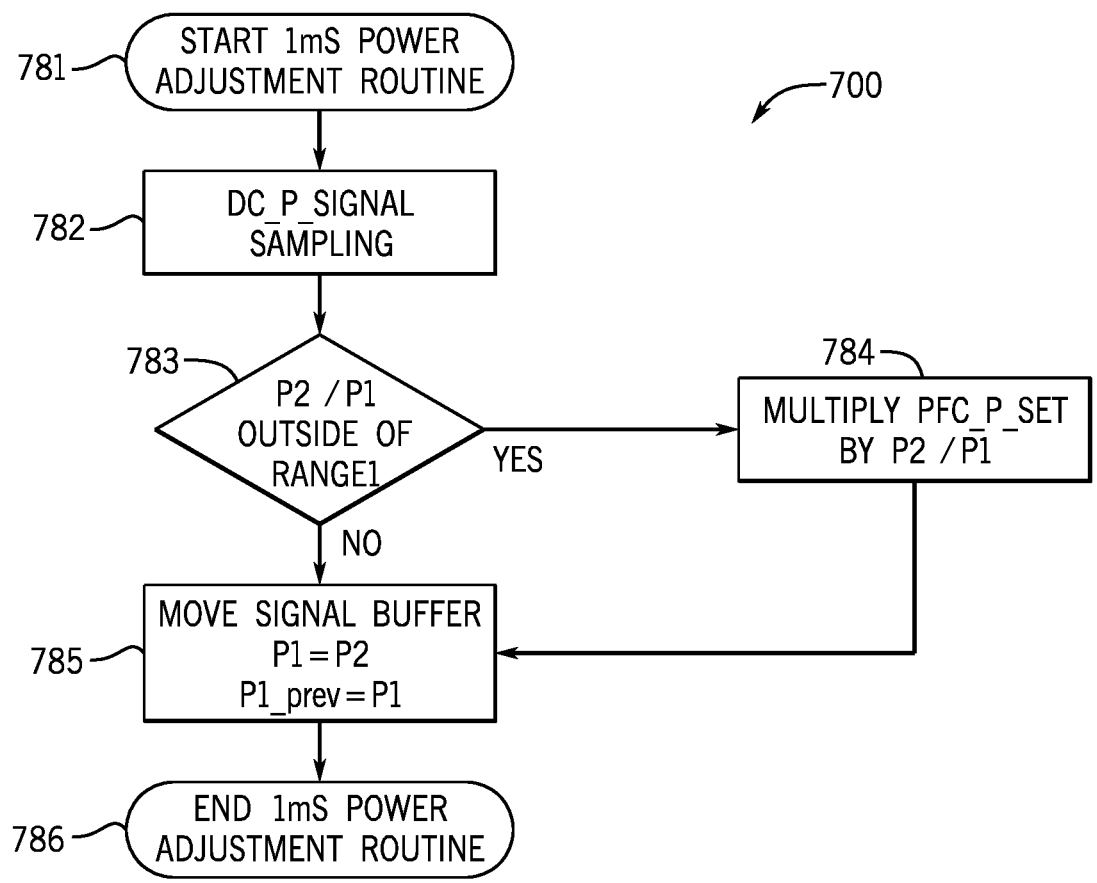
FIG. 7 illustrates a flowchart of a PFC stage control technique.

FIG. 7 illustrates a flowchart 700 of a PFC stage control technique, corresponding to the description above. Beginning in block 781, a power adjustment routine interval begins. In the above-described example, the period is 1 ms, but other values could be chosen as appropriate for a given implementation. Within each sampling interval, the output power signal (represented by DC_P_Signal) can be sampled in block 782. This sample (e.g., sample P2) can be compared to a sample (e.g., sample P1) from a previous sampling interval, e.g., by computing a ratio of the two samples. (Additionally or alternatively, a difference between the samples could be the basis of the comparison.) In block 783, it can be determined whether the ratio (or difference, as appropriate) is outside the pre-determined range that is based on the particular configuration and requirements of a given system. If so, then the significant control parameter of PFC stage 204 can be multiplied (block 784) by the ratio or a factor derived from the ratio (or a factor derived from the difference between P2 and P1 if a difference is used). Then, in block 785 the new current power sample can become the previous power sample (block 785). Otherwise, if the ratio (or difference, as appropriate) between the new power sample P2 and the previous power sample P1 was not outside the predetermined Range 1, the new current power sample can still become the previous power sample as per block 785. This ends the power adjustment routine interval (block 786), and the process can continue repeating at the desired interval, e.g., 1 ms.

Various other signal processing techniques in firmware known to those skilled in the art can additionally or alternatively be used to detect the power change step at the desired interval, e.g., 1 ms in the above example. Additionally, various firmware coding techniques can be used to properly place the sampling point P1/P2, so the power sampling points do not fall on the rising slope, and various firmware coding techniques can be used to properly update the PFC_P_Set other than a multiplication (for instance, an update table or a firmware variable direct update according to the difference (P2−P1)).

Thus, the techniques described herein can limit the overshoot and undershoot on the intermediate bus bulk voltage rail to much lower levels. This can allow the use of a lower capacitance value for the bulk capacitor, dictated only by the hold-up time or operating life requirement. Additionally, the voltage rating of the bulk capacitor may also be reduced due to a tighter control on voltage overshoot during load dump transients. Moreover, in some embodiments Further, such techniques can allow reducing the intermediate bus voltage under lower load conditions to improve operating efficiency without the side effect of output voltage regulation risk in case of large step loads.

The foregoing describes exemplary embodiments of AC-DC power supplies with enhanced digital control of their PFC stages. Such configurations may be used in a variety of applications but may be particularly advantageous when used in conjunction with power supplies for desktop and laptop personal computers, as well as other electronic devices. Although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. An AC-DC power supply comprising:
a power factor correction (PFC) stage that receives a rectified AC input voltage and produces an intermediate DC bus voltage;
a DC-DC stage that receives the intermediate DC bus voltage and produces a regulated DC output voltage; and
a digital controller including:
a relatively faster DC-DC stage controller that receives one or more DC-DC stage feedback signals and produces in response thereto one or more DC-DC drive signals for one or more switching devices of the DC-DC stage;
a relatively slower PFC stage controller that receives one or more PFC feedback signals and produces in response thereto one or more PFC drive signals for one or more switching devices of the PFC stage; and
control logic that receives periodic output power indications of the AC-DC power supply and uses the periodic output power indications of the AC-DC power supply to cause the one or more PFC drive signals to respond to a change in output power of the AC-DC power supply more quickly than would be achieved by the relatively slower PFC stage controller.

2. The AC-DC power supply of claim 1 wherein the PFC stage is a critical conduction mode (CrCM) boost converter.

3. The AC-DC power supply of claim 2 wherein:
a significant control signal of the CrCM boost converter is an on time of a boost switch of the CrCM boost converter; and
the control logic multiplies the significant control signal by a ratio between subsequent output power indications of the AC-DC power supply.

4. The AC-DC power supply of claim 3 wherein the control logic multiplies the significant control signal by the ratio between subsequent output power indications of the AC-DC power supply only if the ratio between subsequent output power indications of the AC-DC power supply exceeds a threshold.

5. The AC-DC power supply of claim 1 wherein the PFC stage is a continuous conduction mode (CCM) boost converter.

6. The AC-DC power supply of claim 5 wherein:
a significant control signal of the CCM boost converter is a multiplier of the CCM boost converter; and
the control logic multiplies the significant control signal by a ratio between subsequent output power indications of the AC-DC power supply.

7. The AC-DC power supply of claim 6 wherein the control logic multiplies the significant control signal by the ratio between subsequent indications of output power of the AC-DC power supply only if the ratio between subsequent indications of output power of the AC-DC power supply exceeds a threshold.

8. The AC-DC power supply of claim 1 wherein the periodic output power indications of the AC-DC power supply are derived at least in part from output current measurements of the DC-DC stage.

9. The AC-DC power supply of claim 8 wherein the periodic output power indications of the AC-DC power supply are derived from output current and output voltage measurements of the DC-DC stage.

10. The AC-DC power supply of claim 1 wherein the periodic output power indications of the AC-DC power supply are derived from input current and input voltage measurements of the DC-DC stage.

11. The AC-DC power supply of claim 1 wherein the periodic output power indications of the AC-DC power supply are derived from a control parameter of the DC-DC stage.

12. A method of controlling an AC-DC power supply having a power factor correction (PFC) stage that receives a rectified AC input voltage and produces an intermediate DC bus voltage and a DC-DC stage that receives the intermediate DC bus voltage and produces a regulated DC output voltage, the method comprising:
receiving one or more DC-DC stage feedback signals and operating one or more DC-DC stage switching devices in response thereto to produce the regulated DC output voltage;
receiving one or more PFC feedback signals and operating one or more PFC stage switching devices in response thereto to produce the intermediate DC bus voltage; and
receiving periodic output power indications of the AC-DC power supply and using the periodic output power indications of the AC-DC power supply to cause one or more PFC drive signals to respond to a change in AC-DC power supply output power more quickly than would be achieved in response to the one or more PFC feedback signals.

13. The method of claim 12 wherein using the periodic output power indications of the AC-DC power supply to cause the one or more PFC drive signals to respond to the change in AC-DC power supply output power more quickly than would be achieved in response to the one or more PFC feedback signals comprises multiplying a significant control signal of the PFC stage by a ratio between subsequent output power indications of the AC-DC power supply.

14. The method of claim 13 wherein multiplying the significant control signal by the ratio between subsequent output power indications of the AC-DC power supply occurs only if the ratio between subsequent output power indications of the AC-DC power supply exceeds a threshold.

15. The method of claim 12 wherein using the periodic output power indications of the AC-DC power supply to cause the one or more PFC drive signals to respond to the change in AC-DC power supply output power more quickly than would be achieved in response to the one or more PFC feedback signals comprises multiplying a significant control signal of the PFC stage by a factor derived from a difference between subsequent output power indications of the AC-DC power supply.

16. The method of claim 15 wherein multiplying the significant control signal by a factor derived from a difference between subsequent output indications of the AC-DC power supply occurs only if the difference exceeds a threshold.

17. A digital controller for an AC-DC power supply having an input power factor correction (PFC) stage that powers an output DC-DC stage, the digital controller comprising:
first control logic that receives one or more DC-DC stage feedback signals and operates one or more switching devices of the DC-DC stage in response thereto to produce a regulated DC output voltage;
second control logic that receives one or more PFC feedback signals and operates one or more switching devices of the PFC stage in response thereto to produce a regulated PFC stage output voltage; and third control logic that receives periodic output power indications of the AC-DC power supply and uses the periodic output power indications of the AC-DC power supply to cause the PFC stage to respond to a change in output power of the AC-DC power supply more quickly than would be achieved by the second control logic.

18. The digital controller of claim 17 wherein:

the PFC stage is a critical conduction mode (CrCM) boost converter;

a significant control signal of the CrCM boost converter is an on time of a boost switch of the CrCM boost converter; and the third control logic multiplies the significant control signal by a ratio between subsequent output power indications of the AC-DC power supply only if the ratio exceeds a first threshold or if a difference between subsequent output power indications of the AC-DC power supply exceeds a second threshold.

19. The digital controller of claim 17 wherein:

the PFC stage is a continuous conduction mode (CCM) boost converter;

a significant control signal of the CCM boost converter is a multiplier of the CCM boost converter; and the third control logic multiplies the significant control signal by a ratio between subsequent output power indications of the AC-DC power supply only if the ratio exceeds a first threshold or if a difference between subsequent output power indications of the AC-DC power supply exceeds a second threshold.

* * * * *